(12) United States Patent
Ye et al.

(10) Patent No.: US 11,446,574 B2
(45) Date of Patent: Sep. 20, 2022

(54) METHOD AND APPARATUS FOR VERTEX RECONSTRUCTION BASED ON TERRAIN CUTTING, PROCESSOR AND TERMINAL

(71) Applicant: NETEASE (HANGZHOU) NETWORK CO., LTD., Zhejiang (CN)

(72) Inventors: Yongsheng Ye, Zhejiang (CN); Kunda Zhong, Zhejiang (CN)

(73) Assignee: NETEASE (HANGZHOU) NETWORK CO., LTD., Zhejiang (CN)

( * ) Notice: Subject to any disclaimer, the term of this patent is extended or adjusted under 35 U.S.C. 154(b) by 0 days.

(21) Appl. No.: 16/756,479

(22) PCT Filed: Nov. 4, 2019

(86) PCT No.: PCT/CN2019/115255
§ 371 (c)(1),
(2) Date: Apr. 16, 2020

(87) PCT Pub. No.: WO2020/206998
PCT Pub. Date: Oct. 15, 2020

(65) Prior Publication Data
US 2022/0016526 A1 Jan. 20, 2022

(30) Foreign Application Priority Data
Apr. 12, 2019 (CN) .......................... 201910295497.7

(51) Int. Cl.
*G06T 19/20* (2011.01)
*G06T 1/20* (2006.01)
(Continued)

(52) U.S. Cl.
CPC .............. *A63F 13/52* (2014.09); *G06T 15/20* (2013.01); *G06T 2210/21* (2013.01)

(58) Field of Classification Search
CPC ....... G06T 17/20; G06T 17/205; G06T 19/20; G06T 2219/2021; A63F 2300/6638
See application file for complete search history.

(56) References Cited

U.S. PATENT DOCUMENTS

2010/0033481 A1 2/2010 Baxes et al.
2016/0093111 A1* 3/2016 Piche ...................... G06T 19/20
345/419

FOREIGN PATENT DOCUMENTS

CN 101763657 A 6/2010
CN 101950435 A 1/2011
(Continued)

OTHER PUBLICATIONS

Huang, Jie <Implementation of_Virtual Cutting Algorithm_Based On Triangle Mesh>; from CNKI; Jun. 30, 2008.

*Primary Examiner* — Lawrence S Galka
(74) *Attorney, Agent, or Firm* — Gang Yu (57) ABSTRACT

A method and apparatus for vertex reconstruction based on terrain cutting, a processor and a terminal are provided. The method includes: position information of a unit block to be removed is acquired, terrain resources in a game scene are cut into multiple terrain chunks, and each terrain chunk is cut into multiple unit blocks; vertex data of at least one adjacent unit block of the unit block to be removed is determined according to the position information; and at least one triangular patch to be rendered is reconstructed according to the vertex data. The present disclosure solves a technical problem that a terrain change mode provided in the related art is limited within a region of a single plane thereby lacking flexibility and realism.

19 Claims, 4 Drawing Sheets

(51) Int. Cl.
 *G06T 17/20* (2006.01)
 *A63F 13/52* (2014.01)
 *G06T 15/20* (2011.01)

(56) References Cited

FOREIGN PATENT DOCUMENTS

| CN | 104504760 A | 4/2015 |
|---|---|---|
| CN | 106251400 A | 12/2016 |
| CN | 107358649 A | 11/2017 |
| CN | 109925716 A | 6/2019 |

* cited by examiner

METHOD AND APPARATUS FOR VERTEX RECONSTRUCTION BASED ON TERRAIN CUTTING, PROCESSOR AND TERMINAL

TECHNICAL FIELD

The present disclosure relates to the field of computers, and in particular to a method and apparatus for vertex reconstruction based on terrain cutting, a processor and a terminal.

BACKGROUND

Terrain rendering in Three-Dimensional (3D) games refers to that the entire terrain in the 3D games is divided into multiple terrain chunks. Each terrain chunk is viewed as a plane composed of multiple vertexes. Information recorded by each vertex for rendering may include, but is not limited to, height, texture UV, and normal vector. Therefore, by adjusting related information of vertexes in an editor, various terrains adopted in a game scene are constructed.

SUMMARY

In an embodiment of the present disclosure, a method for vertex reconstruction based on terrain cutting is provided, which may include the following steps.

Position information of a unit block to be removed is acquired, terrain resources in a game scene being cut into multiple terrain chunks, and each terrain chunk being cut into multiple unit blocks. Vertex data of at least one adjacent unit block of the unit block to be removed is determined according to the position information. At least one triangular patch to be rendered is reconstructed according to the vertex data.

In another embodiment of the present disclosure, an apparatus for vertex reconstruction based on terrain cutting is further provided, which may include:

an acquisition component, configured to acquire position information of a unit block to be removed, terrain resources in a game scene being cut into multiple terrain chunks, and each terrain chunk being cut into multiple unit blocks; a determination component, configured to determine, according to the position information, vertex data of an adjacent unit block of the unit block to be removed; and a reconstruction component, configured to reconstruct at least one triangular patch to be rendered according to the vertex data.

In another embodiment of the present disclosure, a storage medium is further provided, which includes a stored program. When the program is run, a device where the storage medium is located may be controlled to perform the method for vertex reconstruction based on terrain cutting as mentioned above.

In another embodiment of the present disclosure, a processor is further provided. The processor may be configured to run a program. When the program is run, the method for vertex reconstruction based on terrain cutting as mentioned above may be performed.

In another embodiment of the present disclosure, a terminal is further provided. The terminal may include at least one processor, a memory, a display device and at least one program. The at least one program may be stored in the memory, and configured to be executed by the at least one processor. The at least one processor may be configured to perform the method for vertex reconstruction based on terrain cutting as mentioned above.

BRIEF DESCRIPTION OF THE DRAWINGS

The accompanying drawings described herein are used for providing a further understanding of the present disclosure, and constitute a part of the present application, and the exemplary embodiments of the present disclosure and the description thereof are used for explaining the present disclosure, but do not constitute improper limitations to the present disclosure. In the drawings.

DETAILED DESCRIPTION

In order to make those skilled in the art better understand the solutions of the present disclosure, the technical solutions in the embodiments of the present disclosure will be clearly and completely described below with reference to the drawings in the embodiments of the present disclosure. It is apparent that the described embodiments are a part of the embodiments of the present disclosure, not all of the embodiments. On the basis of the embodiments of the present disclosure, all other embodiments obtained on the premise of no creative work of those of ordinary skill in the art should fall within the scope of protection of the present disclosure.

It is to be noted that the specification and claims of the disclosure and the terms "first", "second" and the like in the drawings are used to distinguish similar objects, and do not need to describe a specific sequence or a precedence order. It will be appreciated that data used at such a way may be exchanged under appropriate conditions, in order that the embodiments of the present disclosure described here can be implemented in a sequence other than sequences graphically shown or described here. In addition, terms "include" and "have" and any variations thereof are intended to cover non-exclusive inclusions. For example, it is not limited for processes, methods, systems, products or devices containing a series of steps or elements to clearly list those steps or elements, and other steps or elements which are not clearly listed or are inherent to these processes, methods, products or devices may be included instead.

A terrain vertex plane provided in the related art is adjusted by height values, and an implementation mode of dynamically changing height values of terrain vertexes (for example, randomly reducing the height values of the terrain vertexes at a bombing position) is adopted, thereby generating an effect of terrain destruction and deformation.

However, in a plane dimension, the terrain is changed by modifying height values of the terrain vertexes, which has a greater limitation on expansion of a game space dimension. During the game, an interaction between a game player and terrain change is usually limited within a region of a single plane (for example, an XZ plane in which Y is a height direction).

As to the problem mentioned above, no effective solution has been provided yet.

In an embodiment of the present disclosure, a method for vertex reconstruction based on terrain cutting is provided. It is to be noted that the steps shown in the flowchart of the drawings may be executed in a computer system including, for example, a set of computer-executable instructions. Moreover, although a logic sequence is shown in the flowchart, the shown or described steps may be executed in a sequence different from the sequence here under certain conditions.

The method embodiment may be implemented in a mobile terminal, a computer terminal or a similar computing device. Running on the mobile terminal is taken as an example. The mobile terminal may include at least one processor (the at least one processor may include but is not limited to a processing device such as a Central Processing Unit (CPU), a Graphics Processing Unit (GPU), a Digital Signal Processing (DSP) chip, a Micro Controller Unit (MCU) or a Field Programmable Gate Array (FPGA)) and a memory configured to store data. Optionally, the mobile terminal may further include a transmission device and an input/output device for communication functions. Those skilled in the art can understand that the above structural description is illustrative, and does not limit the structure of the above mobile terminal. For example, the mobile terminal may further include more or less components than those described in the above structural description, or have a configuration different from that described above.

The memory may be configured to store a computer program, for example, a software program and component of application software, such as a computer program corresponding to the method for vertex reconstruction based on terrain cutting in the embodiment of the present disclosure, and the processor executes various functional applications and data processing by running the computer program stored in the memory, that is, implements the above method for vertex reconstruction based on terrain cutting. The memory may include a high speed random access memory and may also include a non-volatile memory such as at least one magnetic storage device, a flash memory, or other non-volatile solid state memories. At some examples, the memory may further include memories remotely located relative to the processor, which may be connected to the mobile terminal over a network. The examples of such networks include, but are not limited to, the Internet, the Intranet, local area networks, mobile communication networks, and combinations thereof.

The transmission device is configured to receive or send data via a network. The above specific network example may include a wireless network provided by a communication provider of the mobile terminal. In one example, the transmission device includes a Network Interface Controller (NIC) that may be connected to other network devices through a base station to communicate with the Internet. In one example, the transmission device may be a Radio Frequency (RF) component for communicating with the Internet wirelessly.

Figure 1:
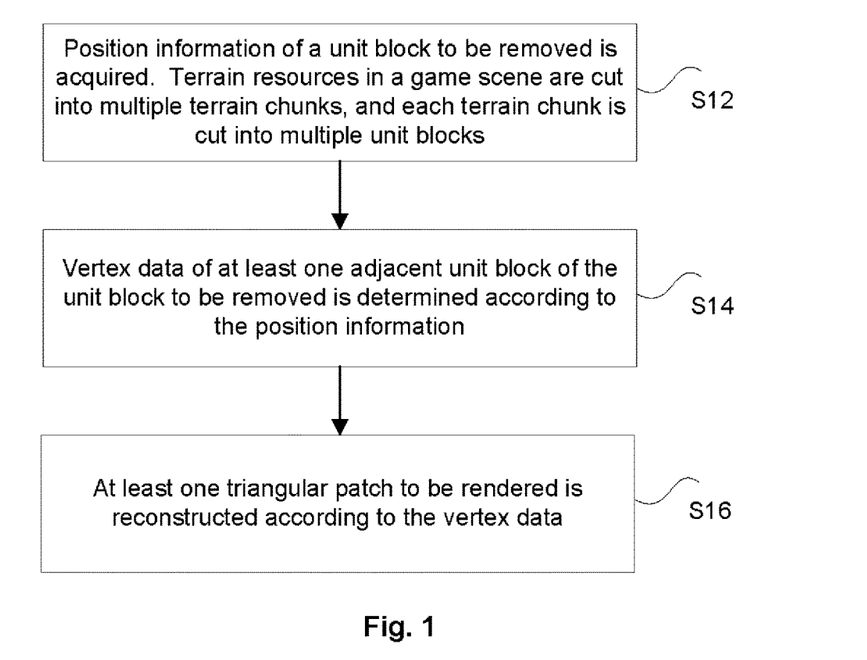
FIG. 1 is a flowchart of a method for vertex reconstruction based on terrain cutting according to an embodiment of the present disclosure.

In the present embodiment, a method for vertex reconstruction based on terrain cutting running on the mobile terminal is provided. FIG. 1 is a flowchart of a method for vertex reconstruction based on terrain cutting according to an embodiment of the present disclosure. As shown in FIG. 1, the method includes the following steps.

At step S12, position information of a unit block to be removed is acquired. Terrain resources in a game scene are cut into multiple terrain chunks, and each terrain chunk is cut into multiple unit blocks.

At step S14, vertex data of at least one adjacent unit block of the unit block to be removed is determined according to the position information.

At step S16, at least one triangular patch to be rendered is reconstructed according to the vertex data.

By means of the above steps, the position information of the unit block to be removed is acquired, terrain resources in a game scene are cut into multiple terrain chunks, and each terrain chunk is cut into multiple unit blocks; the vertex data of the at least one adjacent unit block of the unit block to be removed is determined according to the position information; and the at least one triangular patch to be rendered is reconstructed according to the vertex data. The terrain change is essentially to expand the vertex data of the terrain from a plane dimension to a mesh of any three-dimensional mesh shape, which greatly expands the interactive dimension of a terrain system, and makes the purpose of introducing more interesting and highly playable gameplay around the terrain change, thereby achieving the technical effect of improving the fun and playability of a game by opening up the spatial dimension of the game, and solving the technical problem that a terrain change mode provided in the related art is limited within a region of a single plane thereby lacking flexibility and realism.

The terrain resources in the above game scene may be cut into multiple terrain chunks. Each terrain chunk may be further cut into multiple unit blocks. Each unit block includes an upper surface, a lower surface, and front, back, left and right sides. Each plane in the upper surface, the lower surface, and the front, back, left and right sides is composed of two triangular patches.

Figure 2:
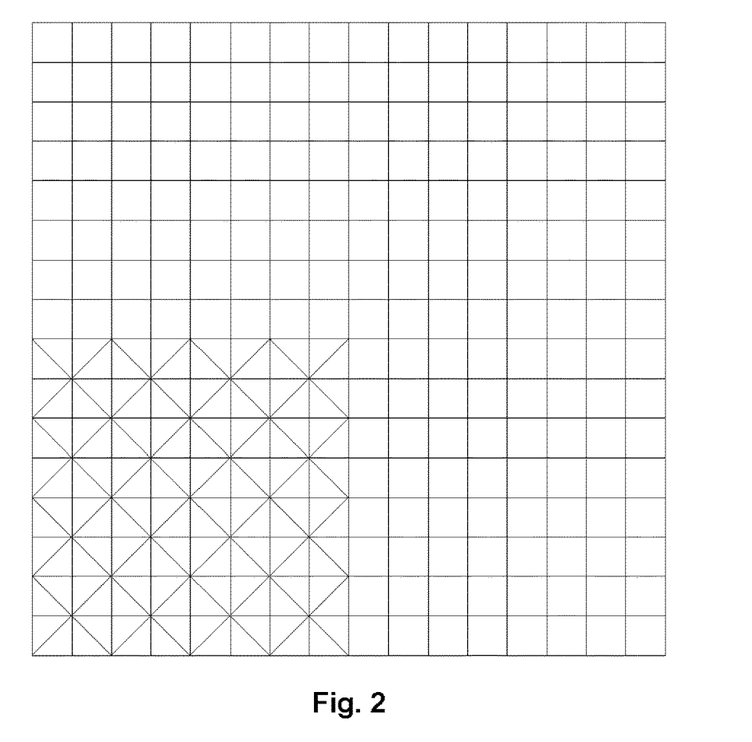
FIG. 2 is a schematic top view of terrain division according to an optional embodiment of the present disclosure.

FIG. 2 is a schematic top view of terrain division according to an optional embodiment of the present disclosure. As shown in FIG. 2, a size of a plane of a terrain chunk in a terrain system is 320 dm length and 320 dm width. A plane mesh size of a unit block obtained by cutting the terrain chunk is 20 dm length and 20 dm width. Each plane mesh of the unit block is associated with four vertexes, and thus two triangular patches are constructed and configured to be output to a rendering system for terrain rendering in the game scene.

Through a mesh vertex cutting algorithm of the terrain system, terrain vertex data at any level in a spatial dimension is acquired and adjusted, and continuous plane vertexes are expanded into non-continuous mesh vertexes in space. At the same time, a reasonable cutting cache policy is used for making the terrain destructed efficiently and stably in actual games.

Optionally, at step S12, the operation that the position information of the unit block to be removed is acquired may include the following execution steps.

At step S121, three-dimensional coordinates of a collision point where an attack trajectory of a game character intersects with a collider of the unit block to be removed are acquired. The three-dimensional coordinates include: a first coordinate and a second coordinate in a horizontal direction, and a third coordinate in a vertical height direction.

At step S122, a volume is extracted from a terrain chunk where the collision point is located according to the first coordinate and the second coordinate. The volume includes: the unit block to be removed, a first unit block adjacent to an upper surface of the unit block to be removed, and a second unit block adjacent to a lower surface of the unit block to be removed.

At step S123, the volume is cut in half to obtain a first cutting volume and a second cutting volume.

At step S124, the position information is determined from the first cutting volume and the second cutting volume respectively according to the third coordinate.

Figure 3:
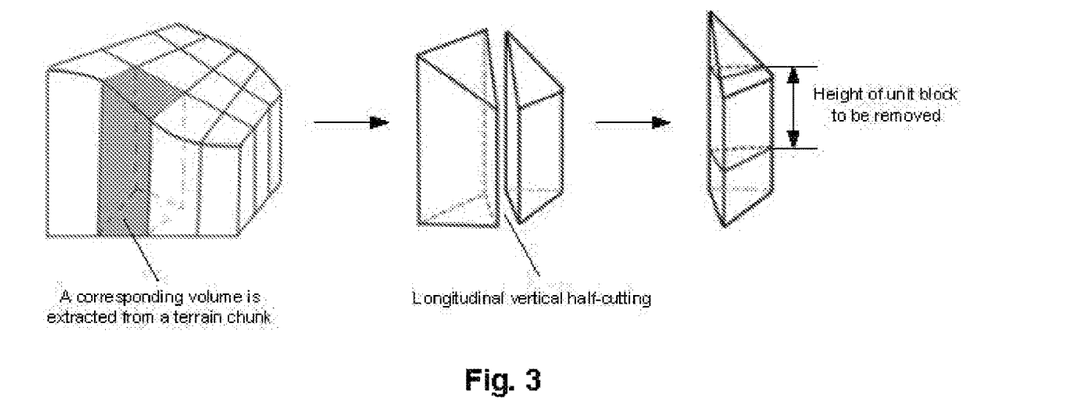
FIG. 3 is a schematic view of acquiring a unit block to be removed according to an optional embodiment of the present disclosure.

When a game character controlled by a game player launches an attack, three-dimensional absolute coordinates (x, y, z) of a collision point where an attack trajectory intersects with the collider of the unit block to be removed can be determined. x and z are first and second coordinates in a horizontal direction, and y is a third coordinate in a vertical height direction. FIG. 3 is a schematic view of acquiring a unit block to be removed according to an optional embodiment of the present disclosure. As shown in FIG. 3, a corresponding volume may be first extracted from the terrain chunk according to coordinates (x/20, z/20) of the collision point. The volume includes the unit block to be removed, the first unit block adjacent to the upper surface of the unit block to be removed, and the second unit block adjacent to the lower surface of the unit block to be removed. Then, since a basic unit for processing the unit block to be removed is a triangle, it is necessary to perform longitudinal vertical half-cutting on the extracted volume to obtain the first cutting volume and the second cutting volume. Finally, the unit block to be removed is cut from the cut volumes (that is, the first cutting volume and the second cutting volume) according to the coordinates (y/15) of the collision point and the height (usually 15 dm) of the unit block to be removed, thereby determining the position information of the unit block to be removed.

Optionally, at step S14, the operation that the vertex data of the at least one adjacent unit block of the unit block to be removed is determined according to the position information may include the following execution steps.

At step S141, it is determined that the unit block to be removed is an underground unit block according to the position information.

At step S142, it is judged whether an adjacent unit block on each of sides to be queried of the underground unit block is removed, and when the adjacent unit block is not removed, coordinate data for reconstructing multiple vertexes of the sides to be queried is determined. The sides to be queried includes: an upper surface, a lower surface and multiple sides of the ground unit block set by default.

At step S143, it is judged whether all sides of the underground unit block have been queried completely, when determining that not all sides of the underground unit block have been queried, the method proceeds to step S142, and when determining that all sides of the underground unit block have been queried, the vertex data of the at least one adjacent unit block of the unit block to be removed is determined.

A vertex reconstruction algorithm of terrain mesh cutting may be divided into vertex reconstruction of underground meshes and vertex reconstruction of surface meshes. The purpose is to calculate vertex data of at least one adjacent mesh of a specified mesh after the specified mesh is removed, thus reconstructing corresponding triangular patches and outputting to the rendering system. A block to which an underground mesh belongs is the underground unit block, and a block to which a surface mesh belongs is the surface unit block.

Figure 4:
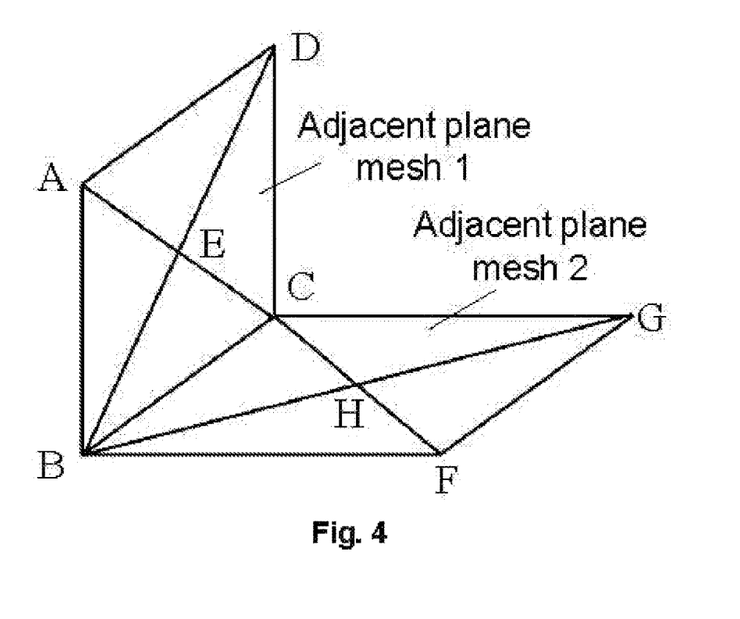
FIG. 4 is a schematic view of vertex reconstruction of an underground mesh according to an optional embodiment of the present disclosure.

The underground mesh refers to a mesh with an upper surface height lower than a minimum height of four vertexes of a surface where the mesh is located. For the underground mesh, it is necessary to query a removal state of at least one adjacent plane mesh. For the non-removed adjacent plane mesh, the corresponding vertexes and triangular patches are constructed. Since each removable unit block is usually a complete hexahedron with six plane meshes (including: an upper surface, a lower surface, and four sides), it is necessary to confirm a current state of a unit block adjacent to each of the six plane meshes. If the adjacent unit block has been removed, there is no need to generate a corresponding adjacent plane mesh. If the adjacent unit block has not been removed, a corresponding adjacent plane mesh is to be generated, and five vertexes and four triangular patches will be constructed. FIG. 4 is a schematic view of vertex reconstruction of an underground mesh according to an optional embodiment of the present disclosure. As shown in FIG. 4, when a unit block adjacent to adjacent plane mesh 1 has not been removed, the adjacent plane mesh is to be generated. Five vertexes are A, B, C, D, and E. Four triangular patches are ABE, BCE, CDE and ADE. Similarly, when a unit block adjacent to adjacent plane mesh 2 has not been removed, the adjacent plane mesh is to be generated. Five vertexes are B, C, G, F, and H. Four triangular patches are BCH, CGH, GFH, and BFH.

Optionally, after step S14, the vertex data of the at least one adjacent unit block of the unit block to be removed is determined according to the position information, the method may further include the following execution steps.

At step S17, the vertex data of the at least one adjacent unit block of the unit block to be removed is stored into a first cache to update the vertex data of the at least one adjacent unit block stored in the first cache.

The vertex data obtained by the vertex reconstruction of the underground mesh may be stored in the first cache. However, as the number of removed unit blocks gradually increases, the storage space consumption of the first cache will increase linearly. At this time, the vertex data of the at least one adjacent unit block of the removed unit block previously stored in the first cache may be updated to reduce the storage space consumption.

Optionally, at step S14, the operation that the vertex data of the at least one adjacent unit block of the unit block to be removed is determined according to the position information may include the following execution steps.

At step S144, it is determined that the unit block to be removed is a surface unit block according to the position information.

At step S145, it is judged whether an adjacent unit block on each of sides to be queried of the surface unit block is removed, and when the adjacent unit block is not removed, coordinate data for reconstructing multiple vertexes of the sides to be queried is determined. The sides to be queried are determined by intersection point positions and vertex positions actually contained in the surface unit block. The intersection point positions are determined by a partial section of the surface unit block intersecting with a surface cutting plane and each default plane of the surface unit block.

At step S146, it is judged whether all sides of the surface unit block have been queried, when determining that not all sides of the surface unit block have been queried, the method proceeds to step S145, and when determining that all sides of the surface unit block have been queried, the vertex data of the at least one adjacent unit block of the unit block to be removed is determined.

Figure 5:
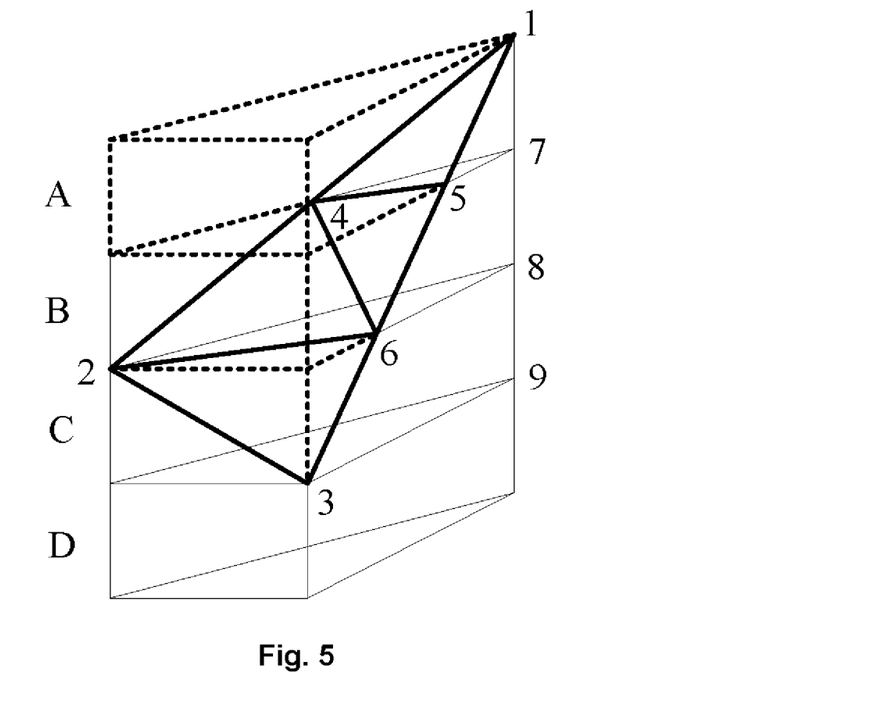
FIG. 5 is a schematic view of vertex reconstruction of a surface mesh according to an optional embodiment of the present disclosure.

The surface mesh refers to a mesh with an upper surface height higher than a minimum height of four vertexes of a surface where the mesh is located. That is, the mesh is connected with the surface. FIG. 5 is a schematic view of vertex reconstruction of a surface mesh according to an optional embodiment of the present disclosure. As shown in FIG. 5, block A, block B, block C, and block D are contained in a cutting volume obtained by performing longitudinal vertical half-cutting on the extracted volume to obtain the unit block to be removed. A triangle formed by vertex 1, vertex 2 and vertex 3 is a surface cutting plane. A partial section of block A intersecting with the surface cutting plane is a triangle formed by vertexes 1, 4 and 5. Partial sections of block B intersecting with the surface cutting plane are a triangle formed by vertexes 4, 5 and 6, and a triangle formed by vertexes 4, 2 and 6. A partial section of block C intersecting with the surface cutting plane is a triangle formed by vertexes 2, 6 and 3. Block D does not form a triangle. Assuming that block B is removed, intersection point positions determined by the partial sections of block B intersecting with the surface cutting plane and each default plane of the surface unit block are vertex 2, vertex 4, vertex 5, and vertex 6. The vertex positions actually contained in block B are vertex 7 and vertex 8. Therefore, it is determined that sides to be queried for block B include an upper surface formed by vertex 4, vertex 5 and vertex 7, a lower surface formed by vertex 2, vertex 6 and vertex 8, a partial section formed by vertex 2, vertex 4, vertex 5 and vertex 6, a side formed by vertex 2, vertex 4, vertex 7 and vertex 8, and a side formed by vertex 5, vertex 6, vertex 7 and vertex 8. Then, it is sequentially judged whether an adjacent unit block with each side to be queried is removed, and when the adjacent unit block is not removed, coordinate data for reconstructing multiple vertexes of the sides to be queried is determined. The upper surface formed by vertex 4, vertex 5 and vertex 7 is taken as an example. If the triangle formed by vertex 1, vertex 4, vertex 5 and vertex 7 is not removed, it is necessary to determine vertex 4, vertex 5 and vertex 7 for reconstructing the upper surface to regenerate the upper surface formed by vertex 4, vertex 5 and vertex 7.

Optionally, after step S14, the vertex data of the at least one adjacent unit block of the unit block to be removed is determined according to the position information, the method may further include the following execution steps.

At step S18, the vertex data of the at least one adjacent unit block of the unit block to be removed is stored into a second cache to update the vertex data of the at least one adjacent unit block stored in the second cache.

The vertex data obtained by the vertex reconstruction of the surface mesh may be stored in the second cache. The second cache is different from the first cache. However, as the number of removed unit blocks gradually increases, the storage space consumption of the second cache will increase linearly. At this time, the vertex data of the at least one adjacent unit block of the removed unit block previously stored in the second cache may be updated to reduce the storage space consumption.

Through the description of the above implementation modes, those skilled in the art can clearly understand that the method according to the above embodiment may be implemented by means of software plus a necessary general hardware platform, and of course, may also be implemented through hardware, but in many cases, the former is a better implementation manner. Based on such understanding, the technical solution of the present disclosure, which is essential or contributes to the conventional art, may be embodied in the form of a software product stored in a storage medium (such as a Read-Only Memory (ROM)/Random Access Memory (RAM), a magnetic disk and an optical disc), including a number of instructions for causing a terminal device (which may be a mobile phone, a computer, a server, or a network device, etc.) to perform the methods described in various embodiments of the present disclosure.

In the present embodiment, an apparatus for vertex reconstruction based on terrain cutting is further provided, which is configured to implement the above embodiments and preferred implementation manners, and the description thereof has been omitted. As used below, the term "component" may implement a combination of software and/or hardware of a predetermined function. Although the apparatus described in the following embodiments is exemplary implemented by software, hardware or a combination of software and hardware is also possible and conceived.

Figure 6:
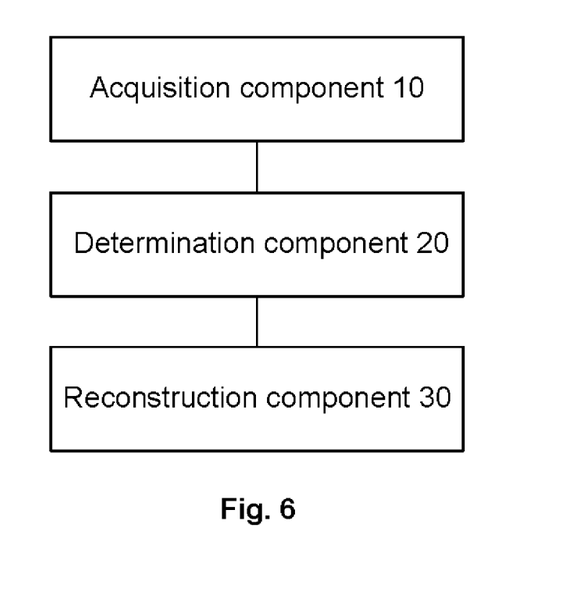
FIG. 6 is a structural block diagram of an apparatus for vertex reconstruction based on terrain cutting according to an embodiment of the present disclosure.

FIG. 6 is a structural block diagram of an apparatus for vertex reconstruction based on terrain cutting according to an embodiment of the present disclosure. As shown in FIG. 6, the apparatus includes: an acquisition component, configured to acquire position information of a unit block to be removed, terrain resources in a game scene being cut into multiple terrain chunks, and each terrain chunk being cut into multiple unit blocks; a determination component 20, configured to determine, according to the position information, vertex data of an adjacent unit block of the unit block to be removed; and a reconstruction component 30, configured to reconstruct at least one triangular patch to be rendered according to the vertex data.

Optionally, the acquisition component 10 includes: an acquisition element (not shown), configured to acquire three-dimensional coordinates of a collision point where an attack trajectory of a game character intersects with a collider of the unit block to be removed, the three-dimensional coordinates including: a first coordinate and a second coordinate in a horizontal direction, and a third coordinate in a vertical height direction; an extraction element (not shown), configured to extract a volume from a terrain chunk where the collision point is located according to the first coordinate and the second coordinate, the volume including: the unit block to be removed, a first unit block adjacent to an upper surface of the unit block to be removed, and a second unit block adjacent to a lower surface of the unit block to be removed; a cutting element (not shown), configured to cut the volume in half to obtain a first cutting volume and a second cutting volume; and a first determination element (not shown), configured to determine the position information from the first cutting volume and the second cutting volume respectively according to the third coordinate.

Optionally, the determination component 20 includes: a second determination element (not shown), configured to determine, according to the position information, that the unit block to be removed is an underground unit block; a first judging element (not shown), configured to judge whether an adjacent unit block on each of sides to be queried of the ground unit block is removed, and when the adjacent unit block is not removed, determining coordinate data for reconstructing multiple vertexes of the sides to be queried, the sides to be queried including: an upper surface, a lower surface and multiple sides of the underground unit block set by default; and a second judging element (not shown), configured to judge whether all sides of the underground unit block have been queried, when determining that not all sides of the underground unit block have been queried, return to the first judging step, and when determining that all sides of the underground unit block have been queried, determine the vertex data of the at least one adjacent unit block of the unit block to be removed.

Figure 7:
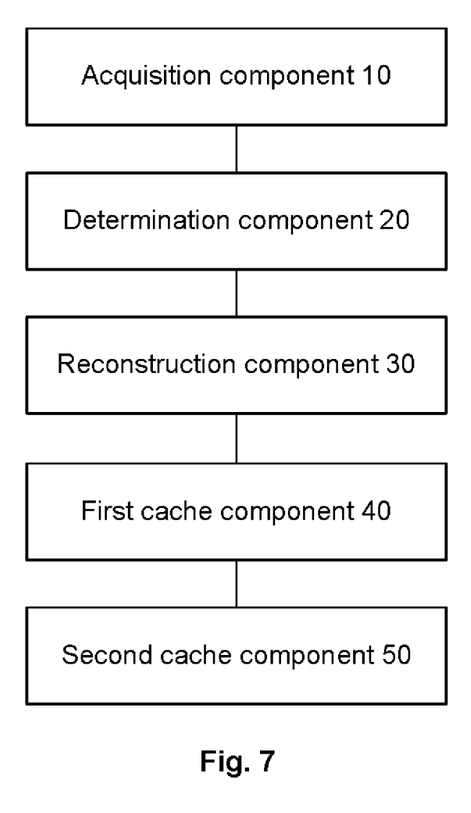
FIG. 7 is a structural block diagram of an apparatus for vertex reconstruction based on terrain cutting according to an optional embodiment of the present disclosure.

Optionally, FIG. 7 is a structural block diagram of an apparatus for vertex reconstruction based on terrain cutting according to an optional embodiment of the present disclosure. As shown in FIG. 7, in addition to all the components shown in FIG. 6, the apparatus further includes: a first cache component 40, configured to store the vertex data of the at least one adjacent unit block of the unit block to be removed into a first cache to update the vertex data of the at least one adjacent unit block stored in the first cache.

Optionally, the determination component 20 includes: a third determination element (not shown), configured to determine, according to the position information, that the unit block to be removed is a surface unit block; a third judging element (not shown), configured to judge whether an adjacent unit block on a side to be queried of the surface unit block is removed, and when the adjacent unit block is not removed, determine coordinate data for reconstructing multiple vertexes of the side to be queried, the side to be queried being determined by intersection point positions and vertex positions actually contained in the surface unit block, and the intersection point positions are determined by a partial section of the surface unit block intersecting with a surface cutting plane and each default plane of the surface unit block; and a fourth judging element (not shown), configured to judge whether all sides of the surface unit block have been queried completely, when determining that not all sides of the surface unit block have been queried, return to the third judging step, and when determining that all sides of the surface unit block have been queried, determine the vertex data of the at least one adjacent unit block of the unit block to be removed.

Optionally, as shown in FIG. 7, the apparatus further includes: a second cache component 50, configured to store the vertex data of the at least one adjacent unit block of the unit block to be removed into a second cache to update the vertex data of the at least one adjacent unit block stored in the second cache.

It is to be noted that each of the above components may be implemented by software or hardware. The latter may be implemented by, but not limited to, the following manners: the above components are all located in the same processor; or, the above components are located in different processors respectively in any combined form.

Another embodiment of the present disclosure further provides a storage medium. The storage medium stores a computer program, where the computer program is configured to perform the steps in any one of the above method embodiments during running.

Optionally, in the present embodiment, the storage medium may be configured to store the computer program for performing the following steps.

At S1, position information of a unit block to be removed is acquired. Terrain resources in a game scene are cut into multiple terrain chunks, and each terrain chunk is cut into multiple unit blocks.

At S2, vertex data of at least one adjacent unit block of the unit block to be removed is determined according to the position information.

At S3, at least one triangular patch to be rendered is reconstructed according to the vertex data.

Optionally, in the present embodiment, the storage medium may include, but is not limited to, various media capable of storing a computer program such as a U disk, a ROM, a RAM, a mobile hard disk, a magnetic disk or an optical disc.

An embodiment of the present disclosure also provides a processor. A memory stores a computer program. The processor is configured to run the computer program to perform the steps in any one of the above method embodiments.

Optionally, in the present embodiment, the processor may be configured to perform the following steps through the computer program.

At S1, position information of a unit block to be removed is acquired. Terrain resources in a game scene are cut into multiple terrain chunks, and each terrain chunk is cut into multiple unit blocks.

At S2, vertex data of at least one adjacent unit block of the unit block to be removed is determined according to the position information.

At S3, at least one triangular patch to be rendered is reconstructed according to the vertex data.

Optionally, a specific example in the present embodiment may refer to the examples described in the above embodiments and optional implementation manners, and details are not described herein in the present embodiment.

The above serial numbers of the embodiments of the present disclosure are for the description, and do not represent the advantages and disadvantages of the embodiments.

In the above embodiments of the present disclosure, descriptions of each embodiment are emphasized respectively, and parts which are not elaborated in detail in a certain embodiment may refer to relevant descriptions of other embodiments.

In several embodiments provided by the present application, it is to be understood that the disclosed technical content may be implemented in other manners. The device embodiments described above are merely illustrative. For example, the division of the element may be a logical function division. In actual implementation, there may be another division manner, for example, multiple elements or components may be combined or integrated into another system, or some features may be ignored or not executed. In addition, the coupling or direct coupling or communication connection shown or discussed may be an indirect coupling or communication connection through some interfaces, elements or components, and may be electrical or otherwise.

The elements described as separate components may or may not be physically separated, and the members displayed as elements may or may not be physical elements, that is, may be located in one place, or may be distributed to multiple elements. Some or all of the elements may be selected according to actual needs to achieve the purpose of the solution of the present embodiment.

In addition, each functional element in each embodiment of the present disclosure may be integrated into one processing element, or each element may exist physically separately, or two or more elements may be integrated into one element. The integrated element may be implemented in a hardware form and may also be implemented in form of software functional element.

The integrated element may be stored in a computer-readable storage medium when being implemented in the form of a software functional element and sold or used as a standalone product. Based on such understanding, the technical solution of the present disclosure, which is essential or contributes to the conventional art, may be embodied in the form of a software product stored in a storage medium (such as a ROM/RAM, a magnetic disk and an optical disc), including a number of instructions for causing a terminal device (which may be a mobile phone, a computer, a server, or a network device, etc.) to perform the methods described in various embodiments of the present disclosure. The foregoing storage medium includes: a U disk, a ROM, a RAM, a mobile hard disk, a magnetic disk, or an optical disk, and the like, which may store a program code.

The above are exemplary implementation of the present disclosure. It is to be noted that a number of modifications and refinements may be made by those of ordinary skill in the art without departing from the principles of the present disclosure, and such modifications and refinements are also considered to be within the scope of protection of the present disclosure.

What is claimed is:

1. A method for vertex reconstruction based on terrain cutting, comprising:
    acquiring position information of a unit block to be removed, terrain resources in a game scene being cut into a plurality of terrain chunks, and each terrain chunk being cut into a plurality of unit blocks;
    determining vertex data of at least one adjacent unit block of the unit block to be removed according to the position information; and
    reconstructing at least one triangular patch to be rendered according to the vertex data;
    wherein acquiring the position information of the unit block to be removed comprises:
    acquiring three-dimensional coordinates of a collision point where an attack trajectory of a same character intersects with a collider of the unit block to be removed, the three-dimensional coordinates comprising: a first coordinate and a second coordinate in a horizontal direction, and a third coordinate in a vertical height direction; extracting a volume from a terrain chunk where the collision point is located according to the first coordinate and the second coordinate, the volume comprising: the unit block to be removed, a first unit block adjacent to an upper surface of the unit block to be removed, and a second unit block adjacent to a lower surface of the unit block to be removed; cutting the volume in half to obtain a first cutting volume and a second cutting volume; and determining the position information from the first cutting volume and the second cutting volume respectively according to the third coordinate.

2. The method as claimed in claim 1, wherein determining the vertex data of the at least one adjacent unit block of the unit block to be removed according to the position information comprises:
    determining (S141) that the unit block to be removed is an underground unit block according to the position information;
    judging (S142) whether an adjacent unit block on each of sides to be queried of the underground unit block is removed, and when the adjacent unit block is not removed, determining coordinate data for reconstructing a plurality of vertexes of the sides to be queried, the sides to be queried comprising: an upper surface, a lower surface and a plurality of sides of the underground unit block set by default; and
    judging (S143) whether all sides of the underground unit block have been queried, when determining that not all sides of the underground unit block have been queried, returning to (S142), and when determining that all sides of the underground unit block have been queried, determining the vertex data of the at least one adjacent unit block of the unit block to be removed.

3. The method as claimed in claim 2, wherein after determining the vertex data of the at least one adjacent unit block of the unit block to be removed according to the position information, the method further comprises:
    storing the vertex data of the at least one adjacent unit block of the unit block to be removed into a first cache to update the vertex data of the at least one adjacent unit block stored in the first cache.

4. The method as claimed in claim 1, wherein determining the vertex data of the at least one adjacent unit block of the unit block to be removed according to the position information comprises:
    determining (S144) that the unit block to be removed is a surface unit block according to the position information;
    judging (S145) whether an adjacent unit block on each of sides to be queried of the surface unit block is removed, and when the at least one adjacent unit block is not removed, determining coordinate data for reconstructing a plurality of vertexes of the sides to be queried, the sides to be queried being determined by intersection point positions and vertex positions actually contained in the surface unit block, and the intersection point positions being determined by a partial section of the surface unit block intersecting with a surface cutting plane and each default plane of the surface unit block; and
    judging (S146) whether all sides of the surface unit block have been queried, when determining that not all sides of the surface unit block have been queried, returning to (S145), and when determining that all sides of the surface unit block have been queried, determining the vertex data of the at least one adjacent unit block of the unit block to be removed.

5. The method as claimed in claim 4, wherein after determining the vertex data of the at least one adjacent unit block of the unit block to be removed according to the position information, the method further comprises:
    storing the vertex data of the at least one adjacent unit block of the unit block to be removed into a second cache to update the vertex data of the at least one adjacent unit block stored in the second cache.

6. The method as claimed in claim 1, wherein each unit block comprises an upper surface, a lower surface, and front, back, left and right sides.

7. The method as claimed in claim 6, wherein each plane in the upper surface, the lower surface, and the front, back, left and right sides is composed of two triangular patches.

8. The method as claimed in claim 1, wherein a basic unit for processing the unit block to be removed is a triangle.

9. The method as claimed in claim 1, wherein cutting the volume in half to obtain a first cutting volume and a second cutting volume comprises:
    performing longitudinal vertical half-cutting on the volume to obtain the first cutting volume and the second cutting volume.

10. The method as claimed in claim 1, wherein the unit block to be removed is cut from the first cutting volume and the second cutting volume according to the coordinates of the collision point and the height of the unit block to be removed.

11. The method as claimed in claim 2, wherein a block to which an underground mesh belongs is the underground unit block.

12. The method as claimed in claim 2, wherein the underground mesh refers to a mesh with an upper surface height lower than a minimum height of four vertexes of a surface where the mesh is located.

13. The method as claimed in claim 4, wherein a block to which a surface mesh belongs is the surface unit block.

14. The method as claimed in claim 4, wherein the surface mesh refers to a mesh with an upper surface height higher than a minimum, height of four vertexes of a surface where the mesh is located.

15. The method as claimed in claim 1, wherein a size of a plane of a terrain chunk in a terrain system is 320 decimeter length and 320 decimeter width.

16. The method as claimed in claim 1, wherein a plane mesh size of a unit block obtained by cutting the terrain chunk is 20 decimeter length and 20 decimeter width.

17. The method as claimed in claim 1, wherein through a mesh vertex cutting algorithm of the terrain system, terrain vertex data at any level in a spatial dimension is acquired and adjusted, and continuous plane vertexes are expanded into non-continuous mesh vertexes in space.

18. A non-transitory storage medium, comprising a stored program, wherein when the stored program is run, a device where the storage medium is located is controlled to perform the method for vertex reconstruction based on terrain cutting as follows:

acquiring position information of a unit block to be removed, terrain resources in a game scene being cut into a plurality of terrain chunks, and each terrain chunk being cut into a plurality of unit blocks;

determining vertex data of at least one adjacent unit block of the unit block to be removed according to the position information; and reconstructing at least one triangular patch to be rendered according to the vertex data;

wherein acquiring the position information of the unit block to be removed comprises:

acquiring three-dimensional coordinates of a collision point where an attack trajectory of a game character intersects with a collider of the unit block to be removed, the three-dimensional coordinates comprising: a first coordinate and a second coordinate in a horizontal direction, and a third coordinate in a vertical height direction; extracting a volume from a terrain chunk where the collision point is located according to the first coordinate and the second coordinate, the volume comprising: the unit block to be removed, a first unit block adjacent to an upper surface of the unit block to be removed, and a second unit block adjacent to a lower surface of the unit block to be removed; cutting the volume in half to obtain a first cutting volume and a second cutting volume; and determining the position information from the first cutting volume and the second cutting volume respectively according to the third coordinate.

19. A terminal, comprising: at least one processor, a memory, a display device, and at least one program, wherein the at least one program are stored in the memory, and configured to be run by the at least one processor, the at least one program being configured to perform the method for vertex reconstruction based on terrain cutting as follows:

acquiring position information of a unit block to be removed, terrain resources in a game scene being cut into a plurality of terrain chunks, and each terrain chunk being cut into a plurality of unit blocks;

determining vertex data of at least one adjacent unit block of the unit block to be removed according to the position information; and reconstructing at least one triangular patch to be rendered according to the vertex data;

wherein acquiring the position information of the unit block to be removed comprises:

acquiring three-dimensional coordinates of a collision point where an attack trajectory of a game character intersects with a collider of the unit block to be removed, the three-dimensional coordinates comprising: a first coordinate and a second coordinate in a horizontal direction, and a third coordinate in a vertical height direction; extracting a volume from a terrain chunk where the collision point is located according to the first coordinate and the second coordinate, the volume comprising: the unit block to be removed, a first unit block adjacent to an upper surface of the unit block to be removed, and a second unit block adjacent to a lower surface of the unit block to be removed; cutting the volume in half to obtain a first cutting volume and a second cutting volume; and determining the position information from the first cutting volume and the second cutting volume respectively according to the third coordinate.

* * * * *